(12) United States Patent
Jones, Jr. et al.

(10) Patent No.: US 6,357,077 B1
(45) Date of Patent: Mar. 19, 2002

(54) SPRING LOADED CASTER

(75) Inventors: Lester R. Jones, Jr., Hamilton; Patrick L. McCartney, Seven Mile, both of OH (US)

(73) Assignee: Hamilton Caster & Mfg. Co., Hamilton, OH (US)

( * ) Notice: Subject to any disclaimer, the term of this patent is extended or adjusted under 35 U.S.C. 154(b) by 0 days.

(21) Appl. No.: 09/687,872

(22) Filed: Oct. 14, 2000

Related U.S. Application Data

(60) Provisional application No. 60/159,835, filed on Oct. 15, 1999.

(51) Int. Cl.[7] ................. B60B 33/00; A47B 91/00
(52) U.S. Cl. ................................ 16/44; 16/35 D
(58) Field of Search ................... 16/44, 35 D, 19; 188/380; 267/178, 216; 248/188.2; 280/47.12, 47.15, 47.16, 47.22

(56) References Cited

U.S. PATENT DOCUMENTS

| | | | |
|---|---|---|---|
| 968,790 A | 8/1910 | Olsen | |
| 1,634,932 A | 2/1927 | Cook | |
| 2,082,017 A | 6/1937 | McClain | |
| 2,447,582 A | 8/1948 | Klumb | |
| 2,458,922 A | 1/1949 | Andresen | |
| 2,577,244 A | 12/1951 | Hedgpeth | |
| 2,885,720 A | 5/1959 | Seeberger | |
| 2,915,776 A | 12/1959 | Hanson et al. | |
| 2,942,290 A | 6/1960 | Segal | |
| 3,102,298 A | 9/1963 | Sheahan | |
| 3,349,425 A | 10/1967 | Rabelos | |
| 4,099,695 A | * 7/1978 | Shinn et al. | 16/44 |
| 4,372,569 A | * 2/1983 | Otterson | 16/44 |
| 4,543,685 A | * 10/1985 | Kassai | 16/35 R |
| 4,559,669 A | * 12/1985 | Bonzer et al. | 16/44 |
| 4,649,596 A | 3/1987 | Kassai | |
| 4,763,910 A | * 8/1988 | Brandli et al. | 16/44 |
| 5,347,680 A | * 9/1994 | Rippe | 16/44 |
| 5,351,364 A | * 10/1994 | Zun | 16/44 |
| 5,355,550 A | 10/1994 | Yang | |

* cited by examiner

Primary Examiner—Chuck Y. Mah
(74) Attorney, Agent, or Firm—Frost Brown Todd LLC

(57) ABSTRACT

A spring loaded caster includes a support plate adapted to be affixed to the underside of an article to be transported. Two caster legs depend downwardly from the support plate. The caster legs are spaced apart and preferably substantially parallel with each other. Each of the caster legs includes an elongated slot for receiving an axle. A pair of spring brackets is provided that are of a generally L-shaped or U-shaped configuration and are disposed on an outer surface of a corresponding caster leg. The spring bracket may include wear plates. A spring sleeves is disposed on an underside of one leg of the spring brackets. Additionally, two or more spring block including an axle receiving segment that includes a passage for receiving an axle therethrough are provided. On each spring block, a spring is held in place by a spring pin and is received in a corresponding spring sleeve. A wheel is provided in the space between the caster blade and an axle that holds the various parts components together is threaded through the spring block assemblies, caster legs, and the wheel. In an alternate embodiment, the rigid spring loaded caster is provided which locks the swivel bearing assembly of the first embodiment of the present invention. Instead, the two caster legs depend downwardly from the underside of the support plate. Preferably, in this rigid embodiment, first and second wear plates are provided on the spring brackets.

20 Claims, 4 Drawing Sheets

SPRING LOADED CASTER

This is a non-provisional application based upon an earlier filed provisional application, Ser. No. 60/159,835 filed Oct. 15, 1999.

TECHNICAL FIELD

The present invention relates generally to casters, and more particularly to, casters having springs to absorb shock and vibrations.

BACKGROUND AND DESCRIPTION OF THE INVENTION

Casters have been employed to protect loads being transported by motorized or non-powered material handling equipment from damage due to rough and uneven surfaces, and obstacles that strike the caster wheels. Shock from obstacles or uneven surfaces may be greatly reduced by using spring loaded casters. The shock dampening effect of spring loaded casters reduces wear on the wheel, caster and conveyance as well. Noise may also be greatly reduced when spring loaded casters are used.

Typically, a spring loaded caster may be a swivel or rigid caster where the wheel and axle assembly is supported with two or more springs to absorb shock and vibrations caused by uneven surfaces, foreign objects and other irregularities of the wheel-engaging surface. Once the spring loaded caster encounters any interference, the springs are compressed so as to absorb the shock, which protects the load from possible damage or sliding off the conveyance.

SUMMARY OF THE INVENTION

In one embodiment of the present invention, a pivotable spring loaded caster includes a support plate adapted to be affixed to the underside of an article to be transported. A swivel bearing assembly is attached at a top side to the underside of the support plate. Two caster legs depend downwardly from the rotatable portion of the swivel bearing assembly. The caster legs are spaced apart and preferably substantially parallel with each other. Each of the caster legs includes an elongated slot for receiving an axle. A pair of spring brackets is provided that are of a generally L-shaped configuration and are disposed on an outer surface of a corresponding caster leg. The spring bracket may include a wear plate.

A spring sleeve is disposed on the underside of one leg of each of the spring brackets. Additionally, two or more spring block assemblies are provided. Each spring block assembly includes an axle-receiving segment that includes a passage for receiving an axle therethrough. On each spring block, a spring is held in place by a spring pin and is received in the corresponding spring sleeve. A wheel is provided in the space between the caster leg and an axle that holds the various parts components together is threaded through the spring block assemblies, caster legs, and the wheel.

In an alternate embodiment, the rigid spring loaded caster is provided which lacks the swivel bearing assembly of the first embodiment of the present invention. Instead, the two caster legs depend downwardly from the underside of the support plate. Preferably, in this alternate embodiment, first and second wear plates are provided on each of the spring brackets.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE PREFERRED EMBODIMENT

Figure 2:
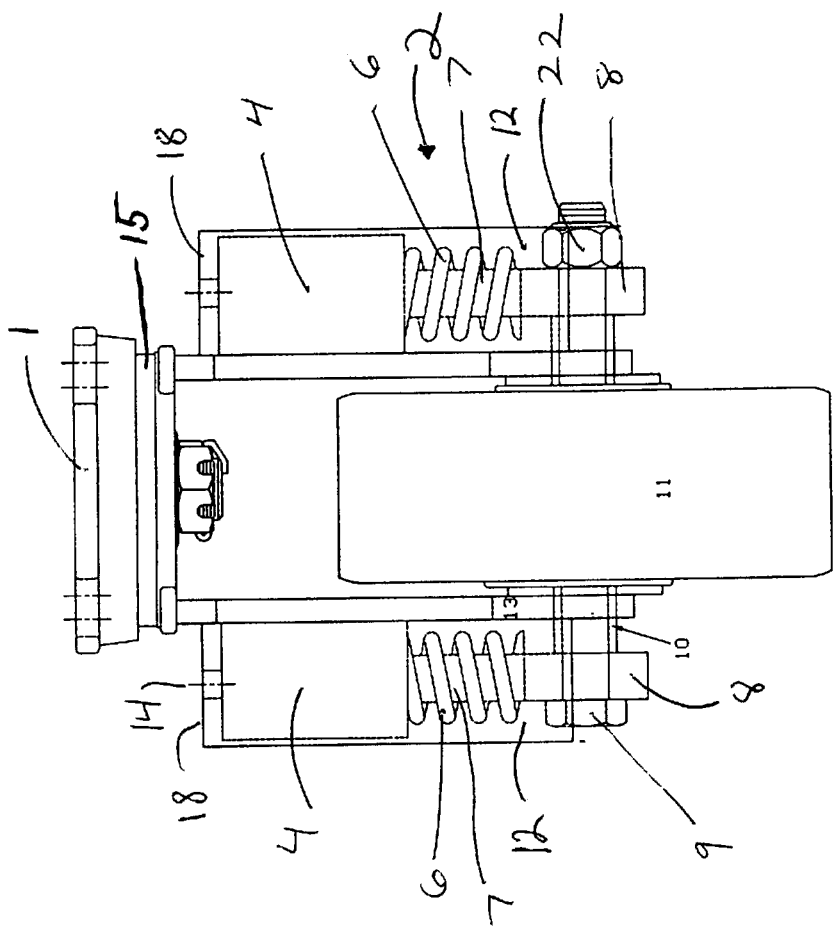
FIG. 2 is a front view of the spring loaded caster of the present invention.
Figure 1:
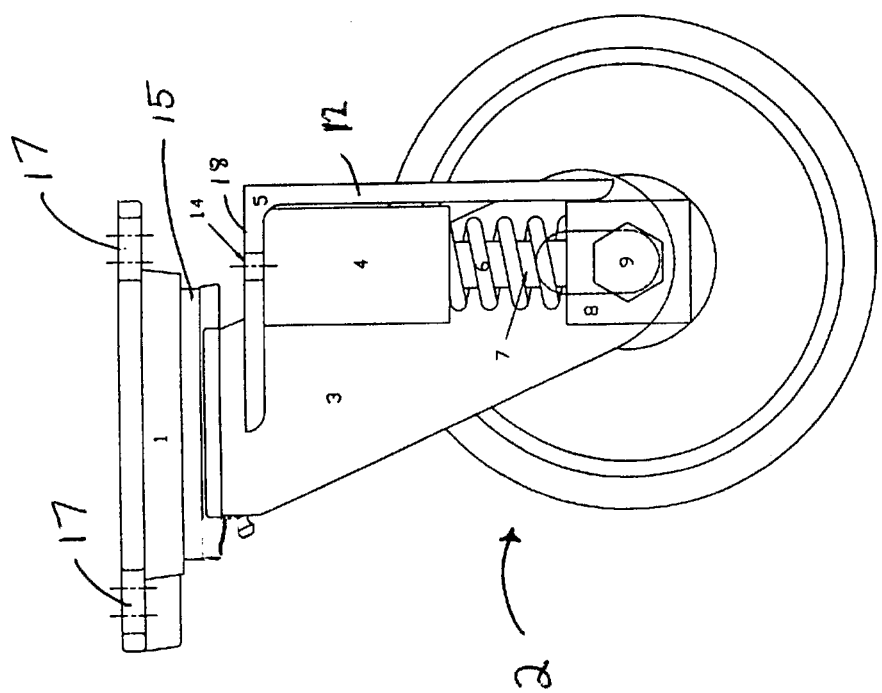
FIG. 1 is side view of the spring loaded caster of the present invention.
Figure 3:
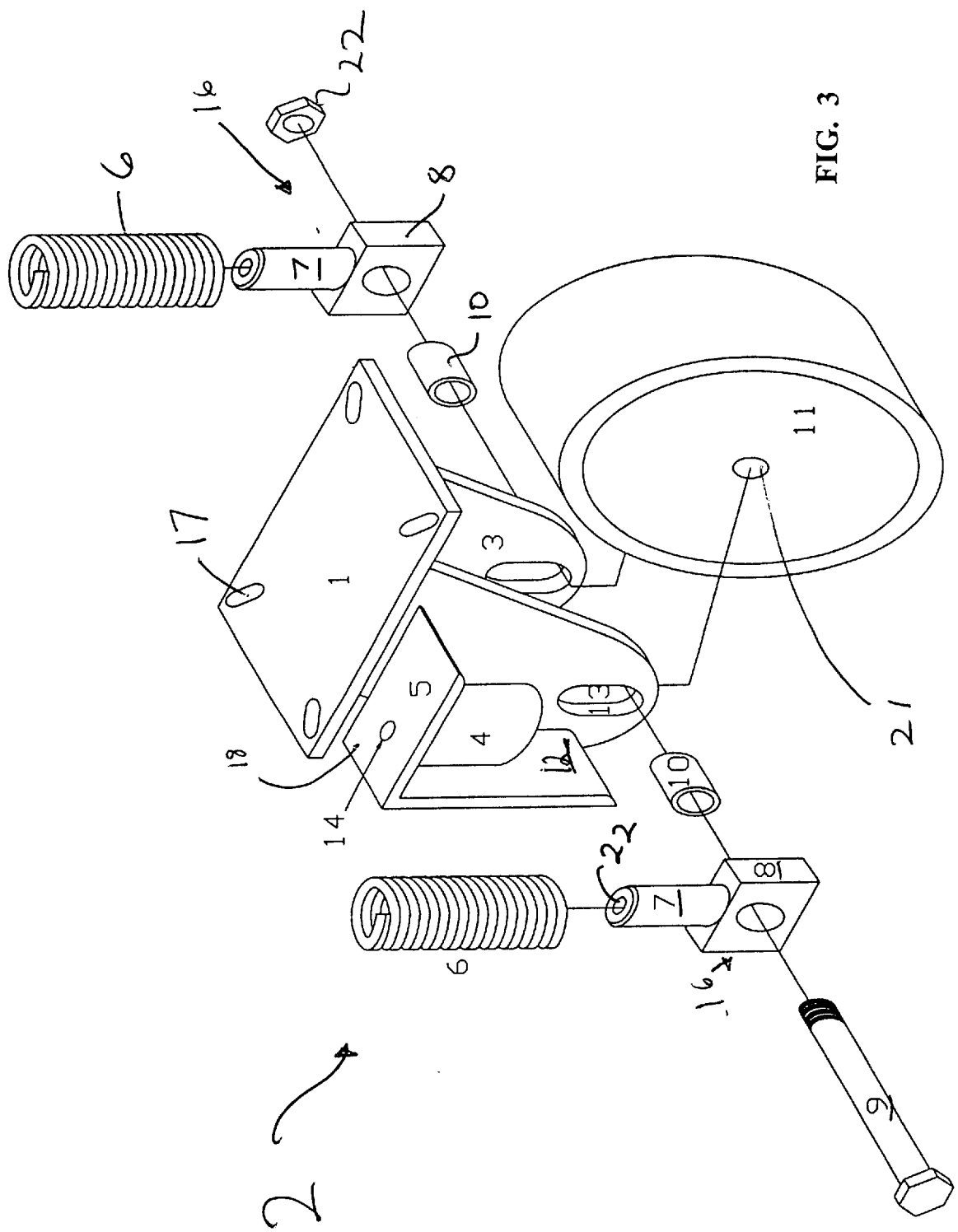
FIG. 3 is an exploded perspective view of the spring loaded caster of the present invention.

Reference will now be made in detail to the presently preferred embodiments of the invention, examples of which are illustrated in the accompanying figures. With reference to FIGS. 1–3, and in accordance with one embodiment of the present invention, a swivel spring loaded caster 2 is shown. The swivel spring loaded caster 2 embodiment of the present invention is appropriate for use when the object supported by the casters 2 needs to be directed or steered, particularly around curves. As best shown in FIGS. 2 and 3, the swivel spring loaded caster 2 includes a support plate 1. As seen in the figures, the support plate 1 preferably includes a plurality of openings 17 provided to allow for attachment to an underside of an article or device to be supported by the spring loaded caster 2. Although it is preferred that openings 17 be provided in the support plate 1, it should be appreciated that the support plate 1 may be attached by any suitable means known in the art to the underside of an item to be transported by casters, such as by welding, adhesive means, bolts, or other similar mechanical devices known in the art.

As best shown in FIGS. 1 and 2, a swivel bearing assembly 15 having a top portion is fixably attached at the top portion to the underside of the support plate 1. The swivel bearing assembly 15 also includes a separate lower portion that is rotatable with respect to the support plate 1 and the top portion of the swivel bearing assembly 15. Preferably, a number of steel ball bearings are held between the upper and lower portions of the swivel bearing assembly 15 to accommodate smooth rotational movement therebetween.

As best shown in FIGS. 1 and 3, two or more caster legs 3, and preferably two caster legs, depend downwardly from the rotatable portion of the swivel bearing assembly 15. Preferably, the two caster legs 3 are spaced apart and substantially parallel with each other as shown in FIG. 3. Preferably, the caster legs 3 are substantially aligned and of a general diagonal configuration. As best shown in FIGS. 1 and 3, each caster leg preferably includes a slot 13. Each slot 13 preferably has a cross-section of an upright and oblong shape. More preferably, the slots 13 are substantially vertically aligned As seen in FIG. 3, each slot 13 of caster legs 3 are preferably transversely aligned.

As shown in FIGS. 1 and 3, two or more spring brackets 5 (preferably two) are provided. Each spring bracket 5 is preferably of a generally L-shaped configuration and includes a first leg 18 that is preferably disposed substantially parallel with the support plate 1. A second leg of the spring bracket 5 preferably comprises a wear plate 12. Wear plate 12 is preferably disposed perpendicular with the support plate 1. The spring brackets are preferably attached to the outer facing surface of the corresponding caster leg 3. As seen in FIG. 3, each of the spring brackets 5 may be attached to caster leg by any conventional means known in the art. Preferably, these components are fixably attached by welding.

As shown in FIGS. 1–3, two or more spring sleeves 4 (preferably two) are each attached to an underside of a first leg 18 of a corresponding spring bracket 5. Each spring sleeve is preferably substantially cylindrical in shape and is hollow so as to slidably accommodate a spring 6 therein. Preferably, each spring sleeve 4 is disposed underneath a spring bracket hole 14 as shown in FIG. 1 to accommodate pretensioning of the spring as will be described in greater detail below.

A pair of spring block assemblies 16 includes an axle receiving segment 8 which includes a passage for receiving an axle 9. On a top surface of axle receiving segment 8, a spring pin 7 is provided, which is adapted to receive a spring 6 thereon. A spring 6 is provided for each spring pin 7. A bottom portion of each spring 6 is supported by a corresponding spring block 8 as best shown in FIG. 1. As best shown in FIG. 2, upper portions of each of the springs 6 are received within the spring sleeve 4.

One or more wheels 11 are provided as shown in the figures. Preferably each swivel caster assembly comprises one wheel 11 that is disposed between the caster legs 3. Each wheel has an aperture 21 adapted to accommodate an axle 9. The wheels 11 may be of any suitable and durable composition, including plastic, polyurethane, and any suitable metal such as cast iron or stainless steel with a rubber tire.

An axle 9 is provided that is disposed through the axle receiving segments 8 of each of the spring block assemblies 16. The axle further extends through the elongated slots 13 of the caster legs 3 and through the apertures 21 of the wheels 11. Further, in an preferred embodiment, one or more bushings or spacers 10 may be provided to receive the axle 9 and to maintain the spring block assembly 16 at a predetermined distance away from caster legs 3. (See FIGS. 2 and 3). The axle 9 may be a standard industrial bolt that is held in position by a linch pin or washer and nut assembly 22.

Figure 5:
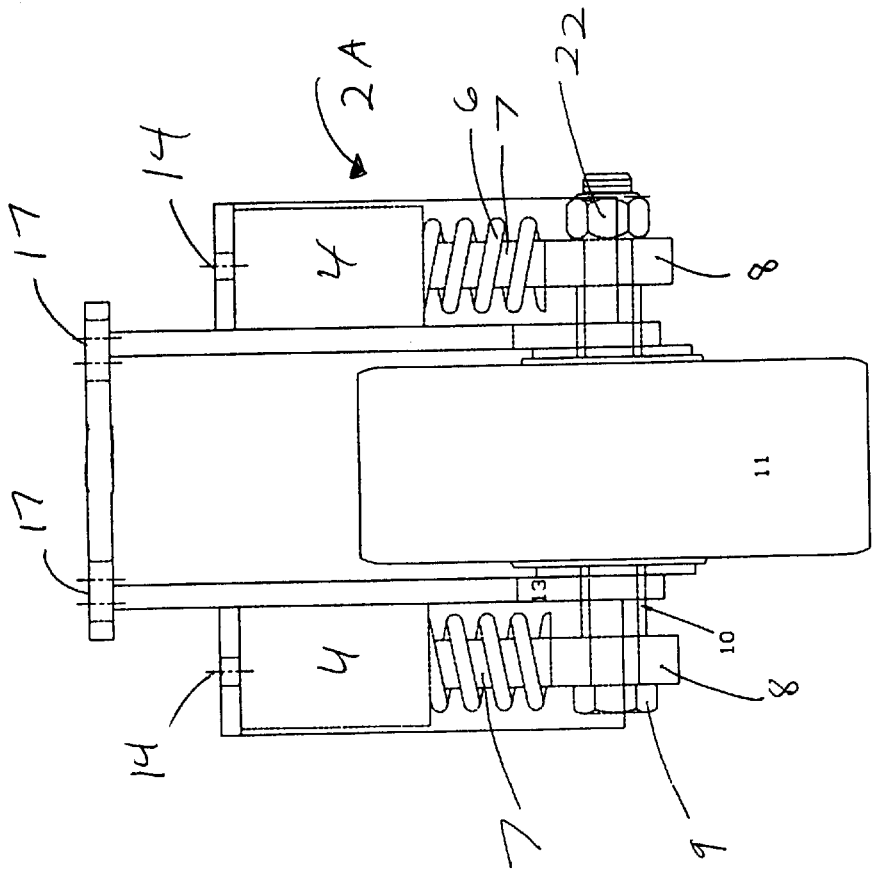
FIG. 5 is a front view of an alternate embodiment of the spring loaded caster of the present invention.
Figure 4:
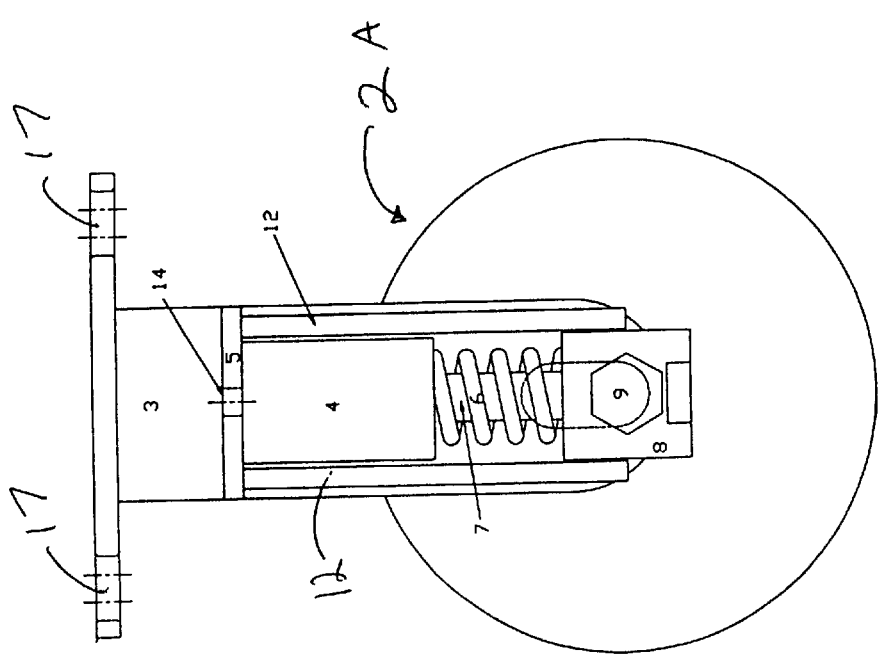
FIG. 4 is a side view of an alternate embodiment of the spring loaded caster of the present invention.
Figure 6:
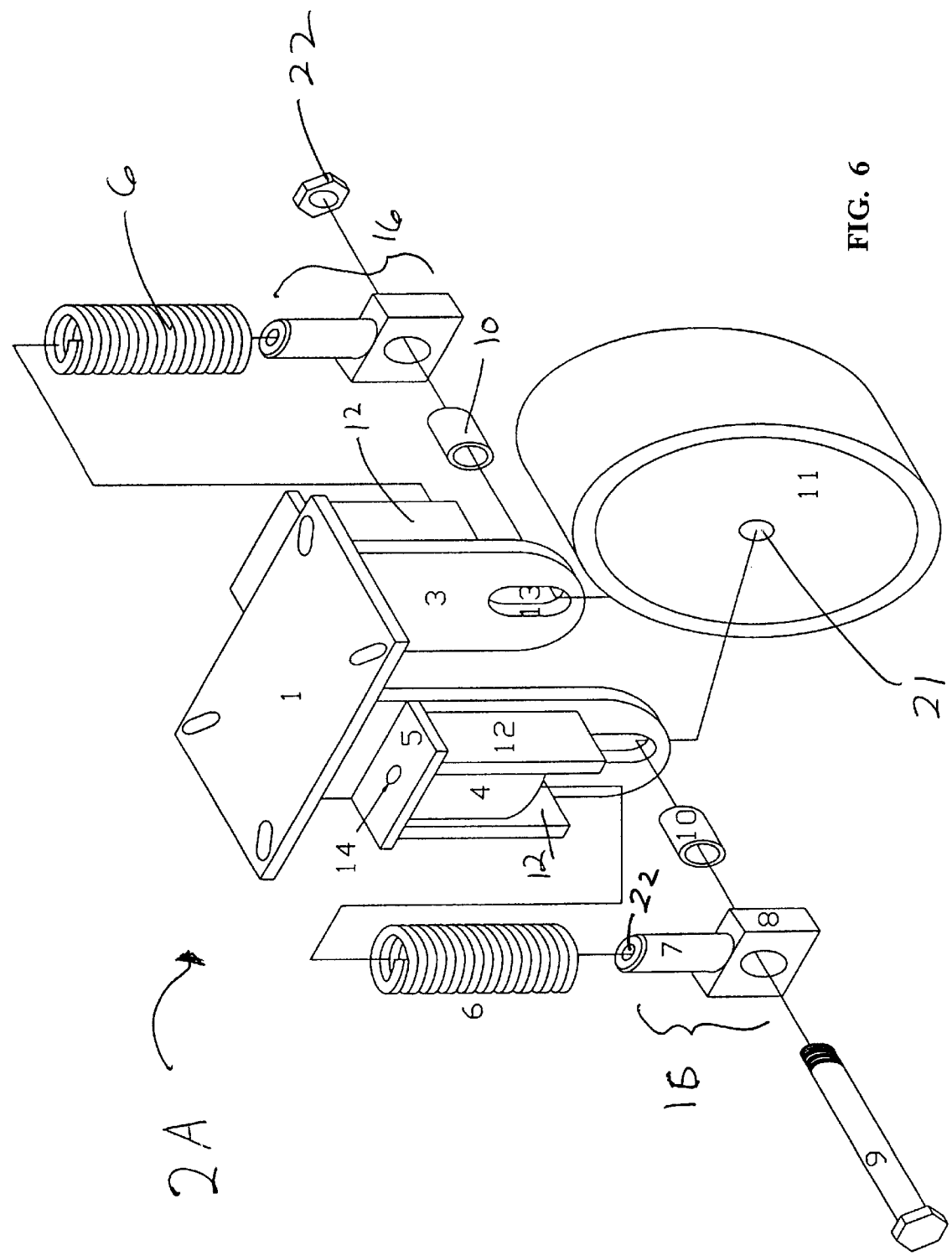
FIG. 6 is an exploded perspective view of an alternate embodiment of the spring loaded caster of the present invention.

As best shown in FIGS. 4–6, an alternate embodiment of the present invention is shown comprising a rigid spring loaded caster 2A. As seen in FIGS. 4–6, this embodiment of the present invention is similar to the first preferred embodiment except that it preferably includes spring brackets 5 having two wear plates 12 per side instead of one per side as on the swivel caster. The second wear plate is desired because a rigid caster will have a reversal of wear when the conveyance being moved (or towed) changes the direction of movement. This does not happen on a swivel caster because the rig rotates and all force is applied in one direction. In this embodiment, it is preferred that legs 3 be substantially vertical and perpendicular with the support plate 1. Also, the caster legs 3, as seen best in FIGS. 4 and 5 depend downwardly from the support plate 1 since the second preferred rigid caster embodiment lacks the swivel bearing assembly 15 of the first preferred embodiment described previously. It should be appreciated that the remaining components of the second preferred embodiment are essentially the same as those of the first preferred embodiment described previously. The various components of the spring loaded casters 2, 2A of the present invention may be comprised of essentially any material known in the art that exhibits sufficient durability and strength. Preferably the materials are made of metal such as cast iron or stainless steel.

For either preferred embodiment, when an installed spring loaded caster wheel 11 encounters a shock from an obstruction or uneven surface, it transfers the shock through the wheel 11 and axle 9 to the spring blocks 8 on each side of the wheel 11. These blocks 8 support the axle 9 that passes through them. The spring brackets 5 along with the slots 13 in the caster legs 3 act as a guide and wear plate for the blocks 8. To absorb shock and so as to minimize the transfer of excess shock to an article being supported by the spring loaded casters 2, 2A of the present invention, the vertical orientation of the slots 13 advantageously permits the axle 9 (and thus the wheel 11) to slide up and down as the wheel encounters surface irregularities or obstacles.

In assembly of the spring loaded casters 2, 2A of the present invention, preloading of springs are set and maintained by the fixed relationship of the slots 13 in the caster legs 3 and the spring brackets 5. To obtain preload spring compression during assembly for both of the preferred embodiments, a bolt (not shown) is passed through the hole 14 in spring bracket and into a threaded hole 22 provided in the end of each spring pin 7. The bolt is tightened until the corresponding spring 6 is compressed enough to accommodate the axle 9 being passed through the spring blocks 8, spacers 10 and the wheel 11. Once the axle 9 is installed, these bolts are removed completely to be reused on the other casters 2, 2A to be assembled. Advantages of this design include the simplicity of the parts used and the simple design and ease of assembly. The caster legs 3 are designed with the substantially vertical slots 13 as can be seen in FIGS. 2 and 5. The springs 3 are located preferably substantially parallel with the slots 13 so as to position the springs 6 in a desired position that will minimize the occurrence of improper bending of the springs 6 which could cause premature spring failure. Springs 6 may be selected based on capacity requirements and preferably the assembled casters 2, 2A would have the springs positioned roughly midway through total travel at full capacity. To increase spring capacity, springs may be nested or added. The slots 13 and spring brackets 5 are designed to keep the wheel in a preloaded position for constant and even compression of springs. The length of the slot is preferably designed in such a manner so that the springs 6 cannot be depressed beyond the maximum usable deflection of the spring, which if surpassed, could cause premature spring failure.

Having shown and described the preferred embodiments of the present invention, further adaptation of the spring loaded caster of the present invention can be accomplished by appropriate modifications by one of ordinary skill in the art without departing from the scope of the present invention. A number of alternatives and modifications have been described herein and others will be apparent to those skilled in the art. Accordingly, the scope of the present invention should be considered in terms of the following claims and is understood not to be limited to the details of the structures shown and described in the specification and drawings.

What is claimed is:

1. A pivotable spring loaded caster comprising:
   a) a support plate;
   b) a swivel bearing assembly, said swivel bearing assembly being fixedly attached at a top portion to an underside of said support plate;

c) two or more caster legs, each of said two or more caster legs depending downwardly from a rotatable portion of said swivel bearing assembly, at least two of said two or more caster legs further being spaced apart and substantially parallel with each other, each of said two or more caster legs comprising a slot, each slot having a cross section of a substantially upright oblong shape, each slot further being substantially aligned with at least one other slot of at least one other leg of said two or more caster legs;

d) two or more spring brackets, each of said two or more spring brackets comprising a generally L-shaped configuration, a first leg of each of said two or more spring brackets being disposed substantially parallel with said support plate, a second leg of each of said two or more spring brackets being disposed substantially perpendicularly with said support plate, at least two of said two or more spring brackets being attached to an outer surface of a corresponding caster leg, each of said two or more spring brackets being substantially aligned with a corresponding spring bracket;

e) two or more spring sleeves, each of said two or more spring sleeves being disposed at an underside of said first leg of one of said two or more spring brackets;

f) two or more spring block assemblies, each of said spring block assemblies comprising an axle receiving segment, said axle receiving segment comprising a passage for receiving an axle therethrough, each of said two or more spring block assemblies comprising a spring pin adapted to receive a spring thereon;

g) two or more springs, each of said two or more springs being slidably received on one of said spring pins, a bottom portion of each of said two or more springs being supported by said spring block, an upper portion of each of said two or more springs being received within one of said two or more spring sleeves;

h) one or more wheels, each of said wheels having an aperture configured to receive an axle;

i) an axle, said axle being disposed through said axle receiving segments of each of said spring block assemblies, slidably through said slots of said two or more caster legs, and through said apertures of said one or more wheels.

2. The pivotal spring bearing caster of claim 1 wherein the said two or more caster legs comprise two caster legs.

3. The pivotal spring loaded caster of claim 1 wherein said two or more spring brackets comprise two spring brackets.

4. The pivotal spring loaded caster of claim 3 wherein said second leg of each spring bracket comprises a wear plate.

5. The pivotal spring loaded caster of claim 1 wherein said two or more said spring sleeves comprises two spring sleeves.

6. The pivotal spring caster of claim 1 wherein said two or more spring block assemblies comprise two spring block assemblies.

7. The pivotal spring caster of claim 1 wherein said two or more springs comprises two springs.

8. The pivotal spring loaded caster of claim 1 wherein said one or more wheels comprises one wheel disposed between said caster legs.

9. The pivotal spring caster of claim 1 wherein said axle comprises a bolt and nut assembly.

10. The pivotal spring caster of claim 1 further comprising first and second spacers disposed between each of said spring block assemblies and said caster leg.

11. A spring loaded caster comprising:

a) a support plate;

b) two or more caster legs, each of said two or more caster legs depending downwardly from said support plate, at least two of said two or more caster legs further being spaced apart and substantially parallel with each other, each of said two or more caster legs comprising a slot, each slot having a cross section of a substantially upright oblong shape, each slot further being substantially aligned with at least one other slot of at least one other leg of said two or more caster legs;

c) two or more spring brackets, a first leg of each of said two or more spring brackets being disposed substantially parallel with said support plate, a second leg of each of said two or more spring brackets being disposed substantially perpendicularly with said support plate, at least two of said two or more spring brackets being attached to an outer surface of a corresponding caster leg, each of said two or more spring brackets being substantially aligned with a corresponding spring bracket;

d) two or more spring sleeves, each of said two or more spring sleeves being disposed at an underside of said first leg of one of said two or more spring brackets;

e) two or more spring block assemblies, each of said spring block assemblies comprising an axle receiving segment, said axle receiving segment comprising a passage for receiving an axle therethrough, each of said two or more spring block assemblies comprising a spring pin adapted to receive a spring thereon f) two or more springs, each of said two or more springs being slidably received on one of said spring pins, a bottom portion of each of said two or more springs being supported by said spring block, an upper portion of each of said two or more springs being received within one of said two or more spring sleeves;

g) one or more wheels, each of said wheels having an aperture configured to receive an axle;

h) an axle, said axle being disposed through said axle receiving segments of each of said spring block assemblies, slidably through said slots of said two or more caster legs, and through said apertures of said one or more wheels.

12. The spring bearing caster of claim 11 wherein said two or more caster legs comprise two caster legs.

13. The spring loaded caster of claim 11 wherein said two or more spring brackets comprise two spring brackets.

14. The spring loaded caster of claim 13 wherein said second leg of each spring bracket comprises a wear plate, said spring bracket further comprising a third leg disposed substantially parallel with said second leg, said third leg also comprising a wear plate.

15. The spring loaded caster of claim 11 wherein said two or more said spring sleeves comprises two spring sleeves.

16. The spring caster of claim 11 wherein said two or more spring block assemblies comprise two spring block assemblies.

17. The spring caster of claim 11 wherein said two or more springs comprises two springs.

18. The spring loaded caster of claim 11 wherein said one or more wheels comprises one wheel disposed between said caster legs.

19. The spring caster of claim 11 wherein said axle comprises a bolt and nut assembly.

20. The spring caster of claim 11 further comprising first and second spacers disposed between each of said spring block assemblies and said caster leg.

\* \* \* \* \*